(12) United States Patent
Meier

(10) Patent No.: US 7,658,439 B2
(45) Date of Patent: Feb. 9, 2010

(54) CROSS MEMBER, IN PARTICULAR A COCKPIT CROSS MEMBER

(75) Inventor: Steffen Meier, Freudental (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/944,915

(22) Filed: Nov. 26, 2007

(65) Prior Publication Data

US 2008/0122265 A1    May 29, 2008

(30) Foreign Application Priority Data

Nov. 24, 2006  (DE) .................. 10 2006 055 506

(51) Int. Cl.
B62D 25/14      (2006.01)
(52) U.S. Cl. .................... 296/193.02; 296/70
(58) Field of Classification Search ............ 296/193.02, 296/70; 280/779; 29/897.2
See application file for complete search history.

(56) References Cited

U.S. PATENT DOCUMENTS

| 5,931,520 | A | 8/1999 | Seksaria et al. | |
|---|---|---|---|---|
| 6,176,544 | B1 | 1/2001 | Seksaria et al. | |
| 6,391,470 | B1 | 5/2002 | Schmieder et al. | |
| 7,048,325 | B1 * | 5/2006 | Sandhu | 296/193.02 |
| 7,322,106 | B2 * | 1/2008 | Marando et al. | 29/897.2 |
| 7,357,447 | B2 * | 4/2008 | Baudart | 296/193.02 |
| 2002/0100243 | A1 * | 8/2002 | Hein et al. | 52/655.1 |
| 2004/0108744 | A1 * | 6/2004 | Scheib et al. | 296/70 |
| 2004/0135400 | A1 * | 7/2004 | Matsuzaki et al. | 296/193.02 |
| 2004/0178652 | A1 * | 9/2004 | Yoshida et al. | 296/72 |
| 2006/0017310 | A1 * | 1/2006 | Joo et al. | 296/193.02 |

FOREIGN PATENT DOCUMENTS

| DE | 19728557 A1 | 1/1998 |
|---|---|---|
| DE | 19845146 A1 | 4/2000 |
| DE | 10029813 A1 | 1/2002 |
| DE | 10124248 A1 | 11/2002 |
| DE | 10152242 A1 | 9/2003 |
| EP | 1529720 A1 | 5/2005 |
| EP | 1655208 A1 | 5/2006 |
| EP | 1762468 A2 | 3/2007 |

* cited by examiner

Primary Examiner—Jason S Morrow

(57) ABSTRACT

A cross member, in particular a cockpit cross member, for a motor vehicle, is connectable at both ends to a vehicle body and supportable in a central area via a supporting element on a longitudinal transmission tunnel of the vehicle. The cross member has at least two cross member elements which are joined together at the end in a central area of the cross member via a connecting member. The connecting member allows compensation of tolerance in the transverse direction of the vehicle. The cross member is connected to the supporting element via the connecting member, the connection between the connecting member and the supporting element allowing compensation of tolerance in the z direction.

16 Claims, 4 Drawing Sheets

CROSS MEMBER, IN PARTICULAR A COCKPIT CROSS MEMBER

CROSS-REFERENCE TO RELATED APPLICATION

This application claims the priority, under 35 U.S.C. § 119, of German application DE 10 2006 055 506.6, filed Nov. 24, 2006; the prior application is herewith incorporated by reference in its entirety.

BACKGROUND OF THE INVENTION

Field of the Invention

The present invention relates to a cross member, in particular a cockpit cross member in a motor vehicle connectable at both ends to a vehicle body. The invention also relates to a vehicle equipped with such a cross member.

A generic cross member is known from U.S. Pat. No. 6,176,544 B1, for example, where the cross member is configured as a cockpit cross member and can be installed in a motor vehicle in the transverse direction between two A pillars of a vehicle body. In a central area, the cross member is supported on the floor, e.g., on a longitudinal transmission tunnel of the motor vehicle. In the longitudinal direction, the cross member has two cross member elements, which are interconnectable in the central area of the cross member via a connecting member. Tolerance compensation of the cross member in the transverse direction of the vehicle is possible via the connecting member.

A similar embodiment of a cross member is known from U.S. Pat. No. 5,931,520.

In addition, a modular member for mounting a dashboard and operating elements as well as display elements of a motor vehicle is known from published, non-prosecuted German patent No. DE 101 52 242 A1, the member having connection points for connection to the vehicle cell in the end areas. The modular member is configured in the form of a tripod, the connecting points at the ends of the tripod each being connectable to the A pillar on the side of the driver, to the longitudinal transmission tunnel in the floor area and to the windshield cross member.

To allow a vehicle to be assembled with the least possible residual stress, tolerance compensation should be allowed for as many components as possible and as long as possible during production. If the individual vehicle components have been joined together, then the initially loose connections can be secured, thereby establishing a stiff connection between the individual automotive components.

BRIEF SUMMARY OF THE INVENTION

It is accordingly an object of the invention to provide a cross member, in particular a cockpit cross member that overcomes the above-mentioned disadvantages of the prior art devices of this general type, in which the cross member is installable in a stress-free manner in a vehicle.

With the foregoing and other objects in view there is provided, in accordance with the invention, a cross member for a motor vehicle and connectable at both ends to a vehicle body. The cross member contains a central area, a connecting member disposed in the central area, and at least two cross member elements joined together in the central area via the connecting member. The connecting member allows a compensation of tolerance in a transverse direction of the motor vehicle. A supporting element is connected to the connecting member. The supporting element is to be connected to a longitudinal transmission tunnel of the motor vehicle. A connection between the connecting member and the supporting element allows a compensation of tolerance in a vertical direction.

The present invention is based on the general ideal of a modular configuration of a cross member, in particular a cockpit cross member, and fixedly joining the individual modules together only at a very late stage of production. The inventive cross member here has at least two cross member elements, which are joined together in a central area of the cross member via a connecting member. The connecting member allows compensation of manufacturing tolerances in the transverse direction of the vehicle. In addition, the cross member is supported in its central area with the connecting member via a supporting element on the vehicle body, in particular on a longitudinal transmission tunnel, the connection between the connecting member and the supporting element here allowing compensation of tolerances in the vertical direction. It is possible in this way to achieve a preferably stress-free installation of the cross member in the vehicle, with the connections between the connecting member on the one hand and the two cross member elements and/or the supporting element on the other hand being secured only at a very late stage in production, when the cross member has already assumed its final installed position. Through the inventive approach, it is thus possible to compensate for tolerances, in particular manufacturing tolerances, not only in the transverse direction of the vehicle, i.e., in the longitudinal direction of the cross member, but also in the vertical direction, because the connection between the connecting member and the supporting element that supports the cross member on the longitudinal transmission tunnel also allows tolerance compensation.

The connecting member and a respective longitudinal end area of the two cross member elements and/or the connecting member and a longitudinal end area of the supporting element can expediently be joined together in a form-fitting manner. Such a form-fitting connection facilitates assembly of the inventive cross member and its installation in the motor vehicle, whereby according to an especially preferred embodiment, the connections between the aforementioned components are configured as plug connections, which permit the desired tolerance compensation through a more or less wide plug-in type insertion of one into the other.

In an advantageous embodiment of the inventive approach, the connecting member has a curved shape. Due to such a curved shape, cross member elements whose axes do not run coaxially, for example, can be joined together so that the two cross member elements may be disposed offset in relation to one another and/or at an inclination, for example. The inventive connecting member thus also allows a connection of cross member elements disposed at an offset to one another. This may have advantages with regard to a driver and/or passenger space, for example, thus permitting space savings.

In another embodiment of the inventive approach, the connecting member is fixedly connected to at least one cross member element and/or to the supporting element, in particular being welded or bonded adhesively. The cross member here with its two cross member elements, the connecting member and the supporting element are initially disposed in a loose connection to one another in the motor vehicle, and only after attaching the two cross member elements and the supporting element are they fixedly connected to the vehicle body. This fixed connection may be accomplished by welding or adhesive bonding of the individual components, for example, so they may then be joined together in a stress-free state, which has a positive effect on the long life of the individual components because then they have a much lower stresses.

It is self-evident that the features mentioned above and those yet to be explained below may be used not only in the particular combination given but also in other combinations or alone without going beyond the scope of the present invention.

Other features which are considered as characteristic for the invention are set forth in the appended claims.

Although the invention is illustrated and described herein as embodied in a cross member, in particular a cockpit cross member, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
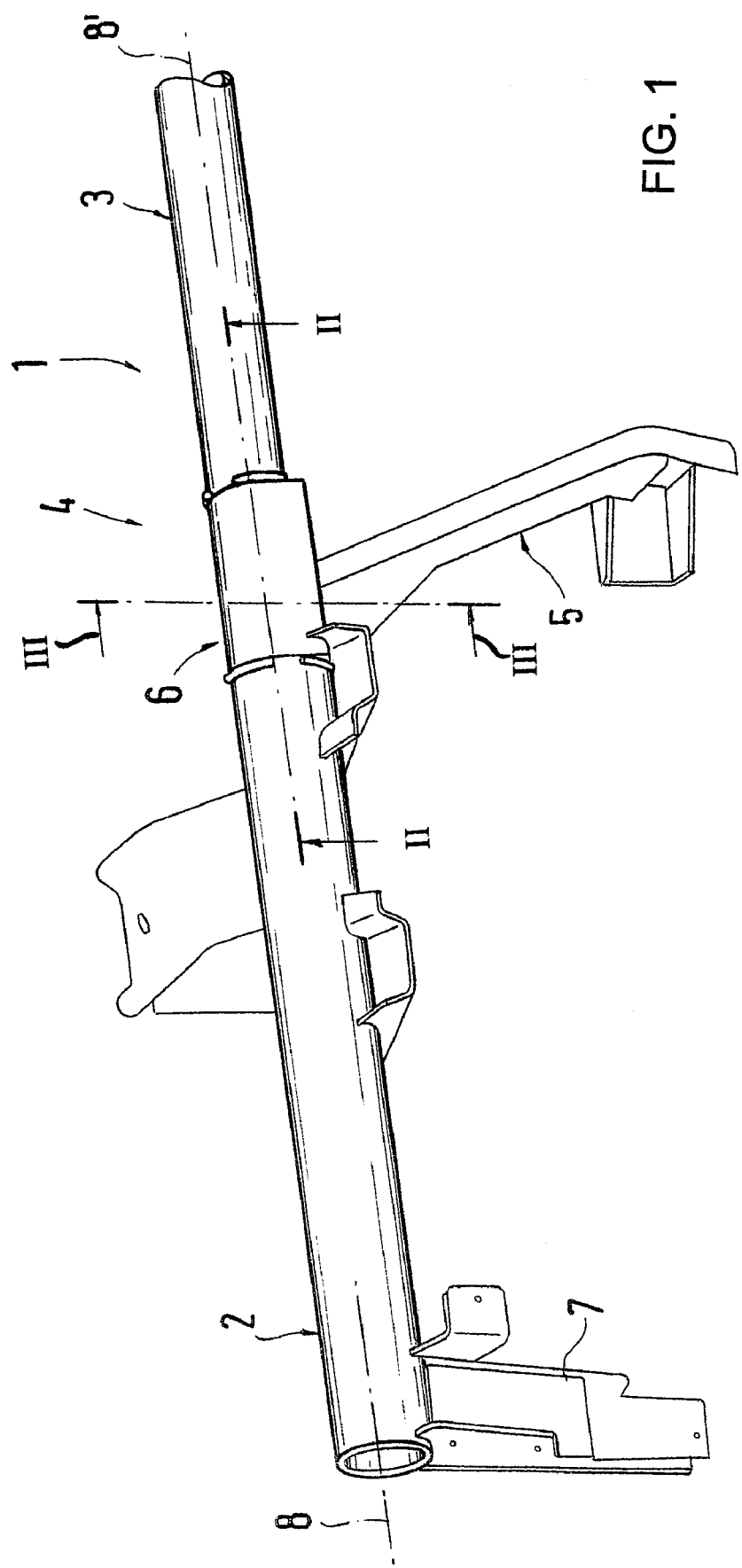
FIG. 1 is a diagrammatic, perspective view of a cross member according to the invention.

Referring now to the figures of the drawing in detail and first, particularly, to FIG. 1 thereof, there is shown a cross member 1, which is configured here as a cockpit cross member and has two cross member elements 2, 3. On each longitudinal end, the cross member 1 is connectable to the body of a non-illustrated vehicle, in particular to the A pillars thereof. Consoles 7 are disposed therefore on the longitudinal end areas of the individual cross member elements 2, 3, each being connectable to the A pillars, but only the console 7 on the cross member 2 is shown in FIG. 1. In its central area 4, the cross member 1 is also supported on the vehicle body via a supporting element 5, preferably being supported on a non-illustrated longitudinal transmission tunnel of the vehicle, thereby reducing the sagging of the cross member 1. In the central area 4, the two cross member elements 2, 3 are connected to one another via a connecting member 6, here configured in the manner of a sleeve, such that the connecting member 6 allows compensation of tolerances in the longitudinal direction of the cross member 1, i.e., in the transverse direction of the vehicle. According to the invention, a connection between the cross member 1 and the supporting element 5 is accomplished via the connecting member 6, and the connection between the connecting member 6 and the supporting element 5 is also configured to allow compensation of tolerances, namely in the vertical direction in this case.

The inventive approach thus creates a cross member 1, which is initially alignable, i.e., in particular adjusted with respect to the connections between the connecting member 6 and the two cross member elements 2, 3 as well as the connections between the connecting member 6 and the supporting element 5. In this alignable state, the cross member 1 can be installed in the motor vehicle, with the consoles 7 being fixedly connected to the A pillars, for example, and the supporting element 5, being fixedly connected to the vehicle body, in particular fixedly connected to the longitudinal transmission tunnel of the vehicle. Then the initially loose connections between the connecting member 6 on the one hand and the cross member elements 2, 3 and/or the supporting element 5 on the other hand are secured by welding and/or adhesively bonding the individual components together, for example. The inventive cross member 1 thus allows a stress-free installation of the cross member 1 in the vehicle because the manufacturing tolerances that usually occur can easily be compensated via the loose connections between the connecting member 6 on the one hand and the two cross member elements 2, 3 and/or the supporting element 5 on the other hand.

Figure 2:
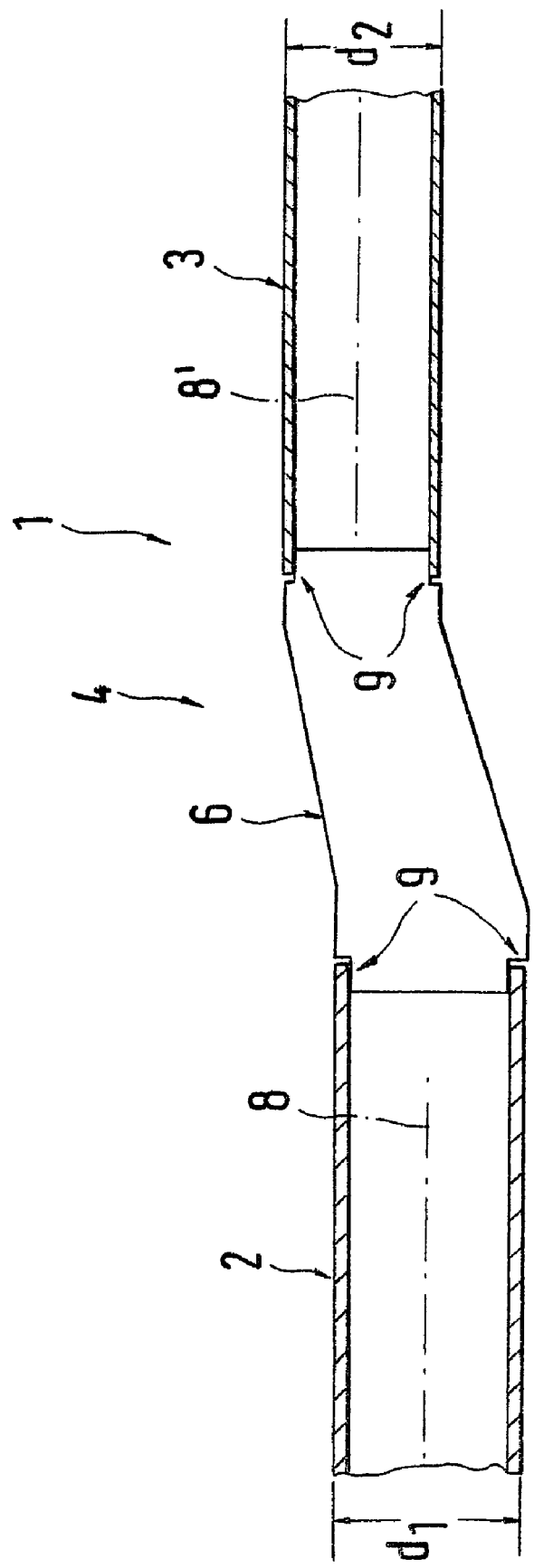
FIG. 2 is diagrammatic, sectional view taken along the line II-II shown in FIG. 1 in an area of a connecting member.

According to FIG. 1, the two cross member elements 2, 3 are configured as tubes, but the present invention is also intended to include other cross-sectional shapes. In particular, the connecting member 6 between the two cross member elements 2, 3 may be configured so that the cross member element 2, for example, has a larger cross section, i.e., diameter, in comparison with the cross member element 3. In addition, it is also conceivable for the connecting member 6 to have a curved shape and thereby allow a connection of two cross member elements 2, 3 that are not aligned with one another. Such a connection is illustrated in FIG. 2, for example, where the axes 8, 8' of the cross member element 2, 3 run parallel to one another on the one hand, while on the other hand, diameter $d_1$ of the cross member element 2 is larger than diameter $d_2$ of the second cross member element 3. Furthermore, it is conceivable for the connecting member 6 to be configured so that the two axes 8, 8' of the cross member elements 2, 3 run at an angle to one another.

FIG. 2 also shows that the connecting member 6 and a respective longitudinal end area of the two cross member elements 2, 3 are engaged in a form-fitting manner in one another, the connection between the connecting member 6 and each of the two cross member elements 2, 3 being configured as a plug connection, so that the connecting member 6 is insertable and/or pluggable at least partially into the respective cross member element 2, 3. In the installed state, the surfaces of the connecting member 6 and the cross member element 2 and/or 3, which are then in contact in a form-fitting manner, are fixedly joined together, e.g., by welding or adhesively bonding. Welding and/or adhesive bonding may be performed according to FIG. 2 in the areas labeled with reference numeral 9.

Figure 3:
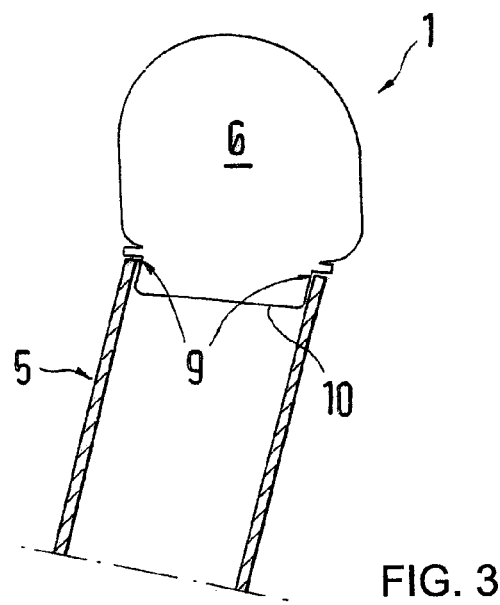
FIG. 3 is a diagrammatic, cross-sectional view taken along line III-III shown in FIG. 1.

The connection between the connecting member 6 and the supporting element 5 may also be configured in the same way as the connection between the connecting member 6 and the two cross member elements 2, 3, as illustrated in the diagram according to FIG. 3, where the connection between the connecting member 6 and the supporting element 5 is also configured as a plug connection, the connecting member 6 being inserted into the supporting element 5 over a certain area. Possible weld points and/or adhesive points here are also labeled with reference numeral 9; these points establish a fixed connection between the connecting member 6 and the supporting element 5.

The connecting member 6 may be made of various materials, in particular cast metal, but other materials are also conceivable if they have the required stiffness. With a connecting member 6 configured as a cast part, an offset is achieved between the cross member element 2 on the driver's side and the cross member element 3 on the passenger's side, while still achieving good crash properties and low steering resonance. The cross member elements 2, 3 and/or the supporting element 5 are preferably configured as a hollow profile, in particular as a tube, and therefore already have a very high flexural stiffness and preferably a low weight. The latter point in particular is of great importance in sports car construction.

Figure 4:
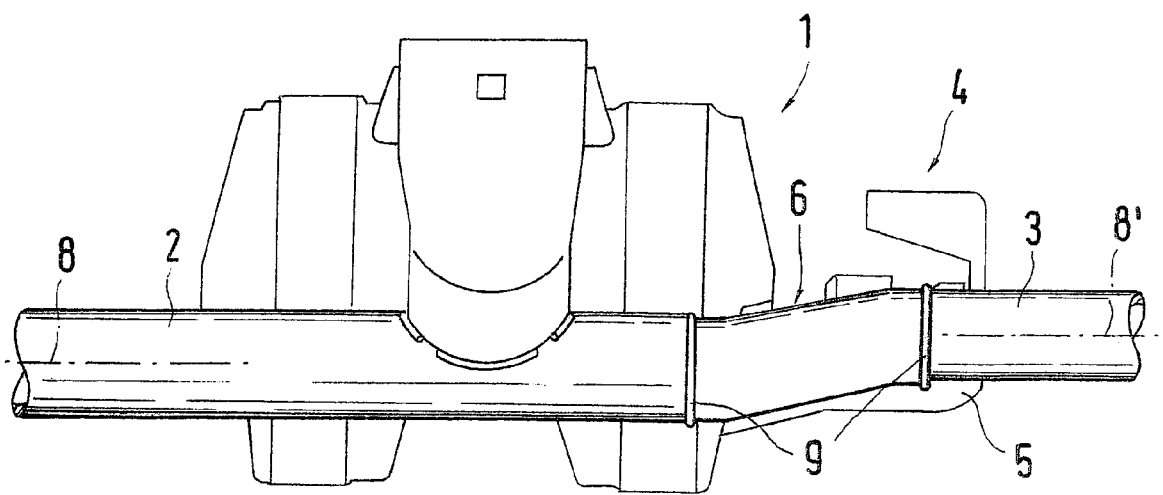
FIG. 4 is a top, perspective view of the cross member in the area of the connecting member.

FIG. 4 again shows the central area 4 of the cross member 1, the offset axes 8, 8' of the two cross member elements 2, 3 being especially discernible here. The different diameters $d_1$, $d_2$ of the two cross member elements 2, 3 are also very discernible here, with the connecting member 6, which connects the two cross member elements 2, 3, being configured as a reduction element here. In addition, a steering column may also be connected to the cross member element 2, which may result in the somewhat larger cross section and/or larger diameter of the cross member element 2 in comparison with the cross member element 3.

Figure 5:
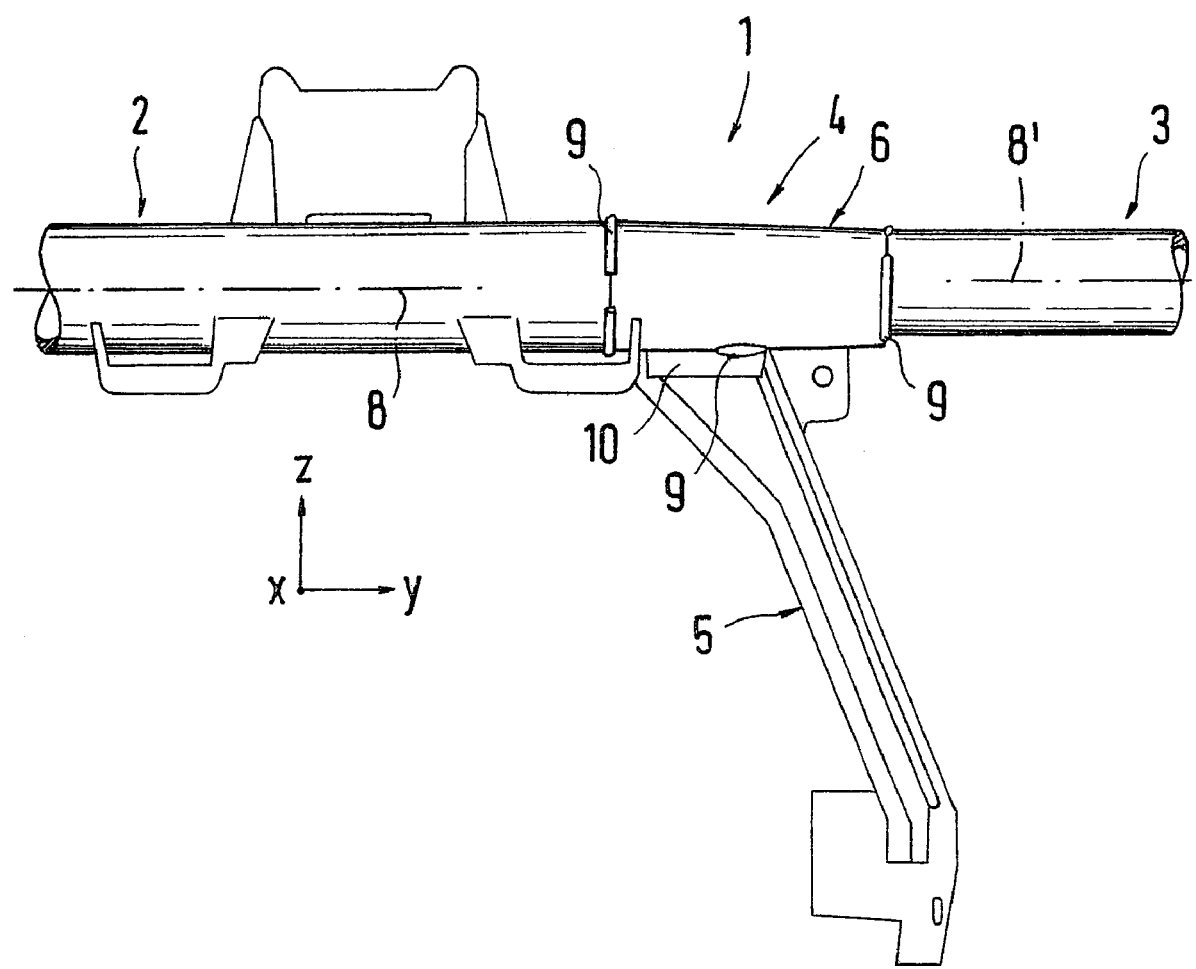
FIG. 5 is a rear, perspective view of the cross member in the area of the connecting member.

FIG. 3 shows the cross member 1 in its central area 4 from the rear, showing a protrusion 10 that extends downward from the connecting member 6 especially well. The protrusion 10 is inserted into the connecting element 5 and allows the compensation of tolerance according to the invention in the z direction. The z direction here is understood to refer generally to the vertical direction, while the y direction represents the transverse direction of the vehicle and the x direction represents the longitudinal direction of the vehicle (see FIG. 5).

In general, the inventive cross member 1 provides for installation of same with loose connections between the connecting member 6 and the supporting element and/or the two cross member elements 2, 3. If the two cross member elements 2, 3 are each connected at one end to the A pillars of the vehicle body and if the supporting element 5 is also connected to the vehicle body, e.g., to the longitudinal transmission tunnel, then the initially loose connections to the connecting member 6 can be nondetachably secured, in particular by welding or adhesive bonding. This allows stress-free installation of the cross member 1 in the vehicle body, while at the same time allowing compensation of certain manufacturing tolerances, which are almost unavoidable.

The invention claimed is:

1. A cockpit cross member for a motor vehicle and connectable at both ends to a vehicle body, the cross member comprising:
   a central area;
   a connecting member disposed in said central area, said connecting member having a plug connection with protrusions;
   at least two cross member elements joined together in said central area via said connecting member, said two cross member elements having longitudinal center axes offset with respect to one another, said connecting member extending between said two cross member elements obliquely relative to said longitudinal center axes and, in said central area with said connecting member, in each case having a different cross-sectional dimension, said cross member elements being connected via said connecting member by means of said plug connection having said protrusions, said connecting member having a curved shape extending between said cross member elements; and
   a supporting element connected to said connecting member, in said central area said supporting element is to be connected to a longitudinal transmission tunnel of the motor vehicle.

2. The cross member according to claim 1, wherein:
   said cross member elements each have a respective longitudinal end area, said connecting member and said respective longitudinal end area are joined in a form-fitting manner; and
   said supporting element has a longitudinal end area, said connecting member and said longitudinal end area of said supporting element are joined in a form-fitting manner.

3. The cross member according to claim 2, wherein said connecting member and said respective longitudinal end area of said two cross member elements are inserted one into the other.

4. The cross member according to claim 1, wherein said cross member elements have different cross sectional dimensions.

5. The cross member according to claim 1, wherein said curved shape allows a connection between said cross member elements having said offset longitudinal center axes.

6. The cross member according to claim 1, wherein at least one of said cross member elements and said supporting element has a round cross section.

7. The cross member according to claim 1, wherein said connecting member is fixedly connected to at least one of said cross member element and said supporting element.

8. The cross member according to claim 1, wherein said connecting member is a cast metal part.

9. The cross member according to claim 1, wherein at least one of said cross member elements and said supporting element is a hollow profile.

10. The cross member according to claim 9, wherein said hollow profile is a tube.

11. The cross member according to claim 1, wherein said connecting member is one of welded and adhesively bonded at least to one of said cross member element and said supporting element.

12. The cross member according to claim 2, wherein said connecting member and said longitudinal end area of said supporting element can be inserted one into the other.

13. The cross member according to claim 1, wherein the cross member is connectable at both ends to A pillars of the vehicle body.

14. The cross member according to claim 1, wherein said cross member elements each have a respective longitudinal end area, said connecting member and said respective longitudinal end area are joined in a form-fitting manner.

15. The cross member according to claim 1, wherein said supporting element has a longitudinal end area, said connecting member and said longitudinal end area of said supporting element are joined in a form-fitting manner.

16. A vehicle, comprising:
   a vehicle body;
   a cross member connected at both ends to said vehicle body, said cross member including:
      a central area;
      a connecting member disposed in said central area, said connecting member having a plug connection with protrusions;
      at least two cross member elements joined together in said central area via said connecting member, said two cross member elements having longitudinal center axes offset with respect to one another, said connecting member extending between said two cross member elements obliquely relative to said longitudinal center axes and, in said central area with said connecting member, in each case having a different cross-sectional dimension, said cross member elements being connected via said connecting member by means of said plug connection having said protrusions, said connecting member having a curved shape extending between said cross member elements; and
      a supporting element connected to said connecting member, said supporting element to be connected to a longitudinal transmission tunnel of the vehicle.

* * * * *